(12) United States Patent
Tanner

(10) Patent No.: US 11,254,045 B2
(45) Date of Patent: Feb. 22, 2022

(54) METHOD AND SYSTEM FOR LINING PIPES

(71) Applicant: Jeffrey M. Tanner, Zanesville, OH (US)

(72) Inventor: Jeffrey M. Tanner, Zanesville, OH (US)

(*) Notice: Subject to any disclaimer, the term of this patent is extended or adjusted under 35 U.S.C. 154(b) by 343 days.

(21) Appl. No.: 16/551,045

(22) Filed: Aug. 26, 2019

(65) Prior Publication Data
US 2021/0060848 A1 Mar. 4, 2021

(51) Int. Cl.
*B29C 63/34* (2006.01)
*B29C 35/04* (2006.01)
*B29C 63/00* (2006.01)
*B29C 65/00* (2006.01)
*B29C 65/78* (2006.01)

(52) U.S. Cl.
CPC ............ *B29C 63/34* (2013.01); *B29C 35/041* (2013.01); *B29C 63/0069* (2013.01); *B29C 65/7838* (2013.01); *B29C 65/7858* (2013.01); *B29C 66/0326* (2013.01); *B29C 66/301* (2013.01); *B29C 66/5221* (2013.01); *B29C 66/612* (2013.01)

(58) Field of Classification Search
CPC ... B29C 35/041; B29C 35/04; B29C 35/1658; B29C 35/16; B29C 63/0069; B29C 63/34; B29C 63/346; B29C 65/78; B29C 65/7802; B29C 65/7838; B29C 65/7858; B29C 65/7861; B29C 65/7879; B29C 65/7888; B29C 65/7891; B29C 66/0326; B29C 66/301; B29C 66/5221; B29C 66/612; F16L 55/1652; F16L 55/1654

USPC ... 156/60, 94, 250, 267, 269, 270, 285, 287, 156/293, 294, 311, 349, 423, 510, 538, 156/574; 138/97, 98; 264/269, 516, 264/36.17; 405/150.1
See application file for complete search history.

(56) References Cited

U.S. PATENT DOCUMENTS

| | | | |
|---|---|---|---|
| 3,996,967 A | 12/1976 | Takada | |
| 4,135,958 A | 1/1979 | Wood | |
| 4,325,772 A * | 4/1982 | Suetoshi | B29C 63/0017 138/97 |
| 4,350,548 A | 9/1982 | Zenbayashi | |
| 4,577,388 A | 3/1986 | Wood | |
| 4,646,787 A | 3/1987 | Rush | |
| 4,680,066 A | 7/1987 | Wood | |
| 4,685,983 A | 8/1987 | Long, Jr. | |
| 4,776,370 A | 10/1988 | Long, Jr. | |
| 4,778,553 A | 10/1988 | Wood | |

(Continued)

*Primary Examiner* — Philip C Tucker
*Assistant Examiner* — Brian R Slawski
(74) *Attorney, Agent, or Firm* — Neustel Law Offices

(57) ABSTRACT

A method and system for inserting a liner and lining pipes from inside a water main or other larger pipe. The method and system generally includes inserting a string inside the first pipe between a first end and a second end, inserting the string through a liner positioning tool, attaching a first end of the string to the liner, and then pulling the liner into the first pipe with the first string such that the liner extends from the first end to the second end of the pipe. One end of the string may be attached to the liner by a pulling insert, which may be a threaded insert that screws into an end of the liner, and which may further include a fluid passage to allow hot water or other fluid to flow through the insert while the string is connected to it.

22 Claims, 15 Drawing Sheets

(56) References Cited

U.S. PATENT DOCUMENTS

| | | | |
|---|---|---|---|
| 5,034,180 A | 7/1991 | Steketee, Jr. | |
| 5,071,616 A | 12/1991 | Miyazaki | |
| 5,200,011 A | 4/1993 | Imamura | |
| 5,340,524 A * | 8/1994 | McMillan | B29C 63/343 264/229 |
| 5,368,423 A | 11/1994 | Hanna | |
| 5,451,351 A * | 9/1995 | Blackmore | F16L 55/1654 264/449 |
| 5,490,964 A | 2/1996 | Kamiyama | |
| 5,503,190 A | 4/1996 | Kamiyama | |
| 5,566,719 A | 10/1996 | Kamiyama | |
| 5,601,763 A | 2/1997 | Hunter | |
| 6,029,726 A | 2/2000 | Tweedie | |
| 6,050,300 A | 4/2000 | Schwert | |
| 6,058,978 A | 5/2000 | Paletta | |
| 6,068,725 A | 5/2000 | Tweedie | |
| 6,093,363 A | 7/2000 | Polivka | |
| 6,270,289 B1 | 8/2001 | Einhaus | |
| 6,682,668 B1 | 1/2004 | Driver | |
| 6,697,710 B2 | 2/2004 | Wilcox | |
| 6,708,728 B2 | 3/2004 | Driver | |
| 7,112,254 B1 * | 9/2006 | Driver | F16L 55/1654 156/285 |
| 7,306,693 B2 | 12/2007 | Weatherby | |
| 7,311,122 B2 | 12/2007 | Kamiyama | |
| 7,356,413 B2 | 4/2008 | Georgi | |
| 7,360,559 B2 | 4/2008 | Driver | |
| 7,686,054 B2 | 3/2010 | Kamiyama | |
| 7,713,374 B2 | 5/2010 | Kamiyama | |
| 7,803,245 B2 | 9/2010 | Kamiyama | |
| 7,905,255 B2 | 3/2011 | Iwasaki-Higbee | |
| 8,016,750 B2 | 9/2011 | Saadat | |
| 8,038,913 B2 | 10/2011 | Driver | |
| 8,235,075 B2 | 8/2012 | Saltel | |
| 8,807,171 B1 | 8/2014 | Tanner | |
| 8,807,172 B2 | 8/2014 | D'Hulster | |
| 9,541,230 B2 | 1/2017 | Tanner | |
| 10,174,877 B2 | 1/2019 | Tanner | |
| 2002/0121338 A1 | 9/2002 | Wright | |
| 2006/0225802 A1 | 10/2006 | Kamiyama | |
| 2007/0163665 A1 | 7/2007 | Lepola | |
| 2007/0275162 A1 | 11/2007 | Kamiyama | |
| 2008/0047624 A1 | 2/2008 | Iwasaki-Higbee | |
| 2009/0134554 A1 * | 5/2009 | Goss | B29C 63/34 264/516 |
| 2009/0194183 A1 | 8/2009 | Kiest, Jr. | |
| 2009/0205733 A1 | 8/2009 | Stringfellow | |
| 2010/0154187 A1 | 6/2010 | Kamiyama | |
| 2014/0109560 A1 | 4/2014 | Ilievski | |

\* cited by examiner

METHOD AND SYSTEM FOR LINING PIPES

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a method and system for lining pipes for lining a service water pipe from inside a water main.

Related Art

Any discussion of the related art throughout the specification should in no way be considered as an admission that such related art is widely known or forms part of common general knowledge in the field.

Pipe lining is a non-invasive pipe rehabilitation process that can be completed without excavation or demolition of property. Pipe lining provides a time and money saving option for the rehabilitation of multiple types of existing pipe systems as compared to removal and replacement of the pipes. Pipe lining has been performed in the United States since the early 1970's. Initially, pipe lining technology was mainly used for large diameter sanitary and storm underground drainage piping in municipal infrastructures. However, as standards and specifications were adopted and as pipe lining technology advanced to become useable with relatively small diameter pipes, pipe lining technology became viable for use in residential and commercial piping system applications.

Pipe lining technology has evolved into multiple applications and industries. These include potable water services, cooling systems, hot water piping, swimming pool and fountain pipes, process piping, mechanical piping as well as electrical & telecommunication conduit. The technology now allows pipes and conduits as small as ½ inch in diameter to be lined. With the materials and installation processes now in use many liners have a life expectancy of fifty plus years.

One such pipe lining technology is the Neofit®+ Plus System. The Neofit®+ Plus System is a non-invasive pipe lining system for small diameter potable water service piping. The Neofit®+ Plus Liner seals small leaks and pinholes in ½" thru 2" ID service piping. It also acts as a barrier between existing lead piping and potable drinking water. The Neofit®+ Plus Liner is NSF-61 approved and has been tested to a minimum 50+ year life expectancy. The Neofit®+ Plus System is distributed by Flow-Liner, Ltd. of Zanesville, Ohio, U.S.A.

One method of installing a pipe liner, including the Neofit®+ Plus Liner, is described in U.S. Pat. No. 8,807,171, which is assigned to the inventor named in the present application, and which is incorporated herein in its entirety by reference. Briefly, a pipe liner having an outer diameter smaller than the inner diameter of the pipe to be lined is inserted into the pipe to be lined and secured at the ends. The pipe liner is typically constructed of a thermoplastic material such as polyethylene terephthalate (PET). The inner pipe liner is then expanded into contact with the inner walls of the pipe. In the method described in the '171 patent, hot water generated by an in-line heater is flowed through the liner to soften and expand the material into contact with the inner walls of the service pipe, and cool compressed air is then flowed through the liner to cool the liner and cause it to set in the expanded state. In addition to air, cold water can also be used to cool the liner.

In the past, it has been difficult and expensive to line a water service pipe (or other pipe) between a building or house and the water main once it is installed, and there is thus a need for a method and system for lining pipes without having access to both ends of a water service line, or other pipe that is connected to a larger pipe.

SUMMARY

An example embodiment is directed to a method and system for lining pipes. The method includes the steps of inserting a first string inside the first pipe between the first end and the second end, inserting the first string through a liner positioning tool, attaching a first end of the first string to the liner, and then pulling the liner into the first pipe with the first string such that the liner extends from the first end to the second end. The first end of the first string may be attached to the liner by a pulling insert, which may be a threaded insert that screws into an end of the liner, and which may further include a fluid passage to allow hot water or other fluid to flow through the insert while the first string is connected to it.

The method may also comprise pulling a mandrel through the first pipe with the first string to ensure the liner will fit inside the first pipe. Further, inserting the first string inside the first pipe may comprise tying a second end of the first string to a carrier (such as a foam "pig") and using a compressed fluid, such as compressed air, to force the carrier through the first pipe from the first end to the second end.

To implement the method, a liner positioning tool may be used. The positioning tool can be pushed or pulled into position inside of a pipe, and it may include a camera, multiple inflatable bladders, and a motor/gear system to rotate a positionable tube. The positioning tool can be used to very accurately position a tube so that its opening is very close to, and aligned with, the second end of the first pipe. In an example embodiment, the liner positioning tool may comprise a tube with an opening, and the method may further comprise using the liner positioning tool to position the opening proximate the second end of the first pipe. In addition, the liner positioning tool may be inside the second pipe when it is used to position the opening. The opening may further comprise a sealing fitting, and the method may further comprise pulling the liner into the sealing fitting such that the liner is sealingly connected to the tube of the liner positioning tool.

The method may further comprise expanding the liner inside the first pipe until it is in contact with the inside of the first pipe by circulating a hot fluid (such as hot water) under pressure through the liner, and then cooling the liner by circulating a fluid, such as cold air or water, through the liner. The method may further include cutting off the expanded liner inside the second pipe, proximate the second end of the first pipe, and then inserting an end-seal fitting into the expanded liner. The insertion may be done by using a robotic positioning tool.

There has thus been outlined, rather broadly, some of the embodiments of the method and system for lining pipes in order that the detailed description thereof may be better understood, and in order that the present contribution to the art may be better appreciated. There are additional embodiments of the method and system for lining pipes that will be described hereinafter and that will form the subject matter of the claims appended hereto. In this respect, before explaining at least one embodiment of the method and system for lining pipes in detail, it is to be understood that the method and system for lining pipes is not limited in its application to the details of construction or to the arrangements of the components set forth in the following description or illustrated in the drawings. The method and system for lining pipes is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
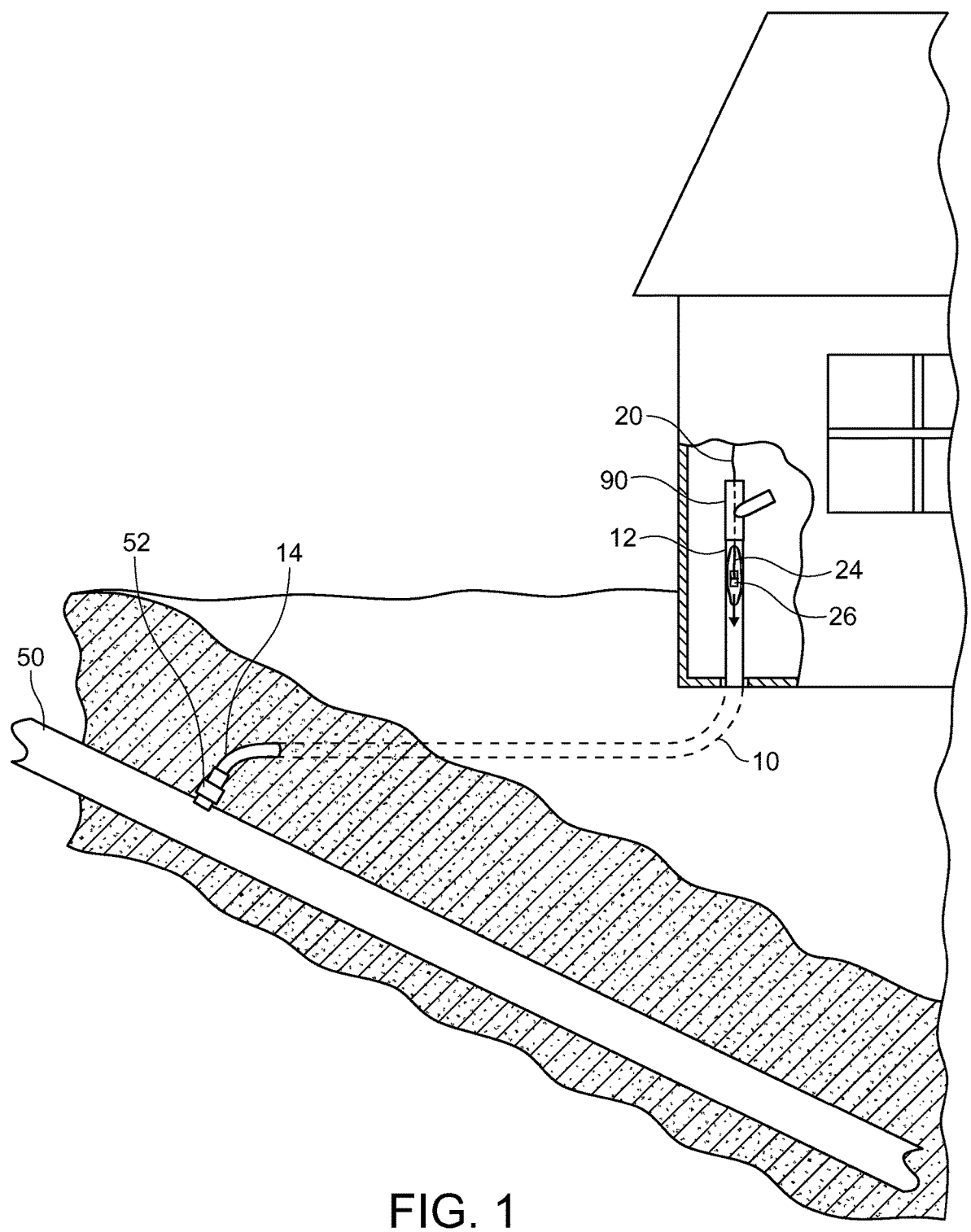
FIG. 1 is a perspective view of a system for lining the inside of pipes in accordance with an example embodiment.

A. Overview.

An example method for lining a first pipe 10, such as a water service pipe between a house and a water main 50, with a liner 30, generally comprises inserting a first string 20 inside the first pipe 10 between the first end 12 and the second end 14, inserting the first string 20 through a liner positioning tool 40, attaching a first end 22 of the first string 20 to an end of the liner 30, and then pulling the liner 30 into the first pipe 10 with the first string 20 such that the liner extends from the first end 12 to the second end 14. The first end 22 of the first string 20 may be attached to the liner 30 by a pulling insert 32, which may be a threaded insert that screws into an end of the liner, and which may further include a fluid passage 33 to allow hot water or other fluid to flow through the insert 32 while the first string 20 is still connected to it.

The method may also comprise pulling a mandrel 34 through the first pipe 10 with the first string 20 to ensure that the liner 30 will fit inside the first pipe 10. Further, inserting the first string 20 inside the first pipe 10 may comprise tying a second end 24 of the first string to a carrier 26 (such as a foam "pig") and using a compressed fluid, such as compressed air, to force the carrier 26 through the first pipe 10 from the first end 12 to the second end 14. The carrier 26 then pulls the string 20 through the service pipe 10 from the house or building to the inside of the second pipe 50 (water main).

In an example embodiment, the liner positioning tool 40 may comprise a tube 42 with an opening 44, and the method may further comprise using the liner positioning tool 40 to position the opening 44 at or near the second end 14 of the first pipe 10. In addition, the liner positioning tool 40 may be inside the second pipe 50 when it is used to position the opening 44 near the end 14 of the pipe 10, near the service pipe tap 52. The opening may further comprise a sealing fitting 46, and the method may further comprise pulling the liner 30 with the string into the sealing fitting 46 such that the liner 30 is sealingly connected to the tube 42 of the liner positioning tool 40.

The method may further comprise expanding the liner 30 inside the first pipe 10 until it is in contact with the inside of the first pipe 10 by circulating a hot fluid (such as hot water) under pressure through the liner 30, and then cooling the liner by circulating a fluid, such as cold air or water, through the liner. The method may further include using a robotic positioning tool 60 to cut off the expanded liner 30 inside the second pipe 50, proximate the second end 14 of the first pipe 10, and then inserting an end-seal fitting 36 into the expanded liner. The insertion may be done by using the robotic positioning tool 60.

B. Inserting the Liner.

Figure 14:
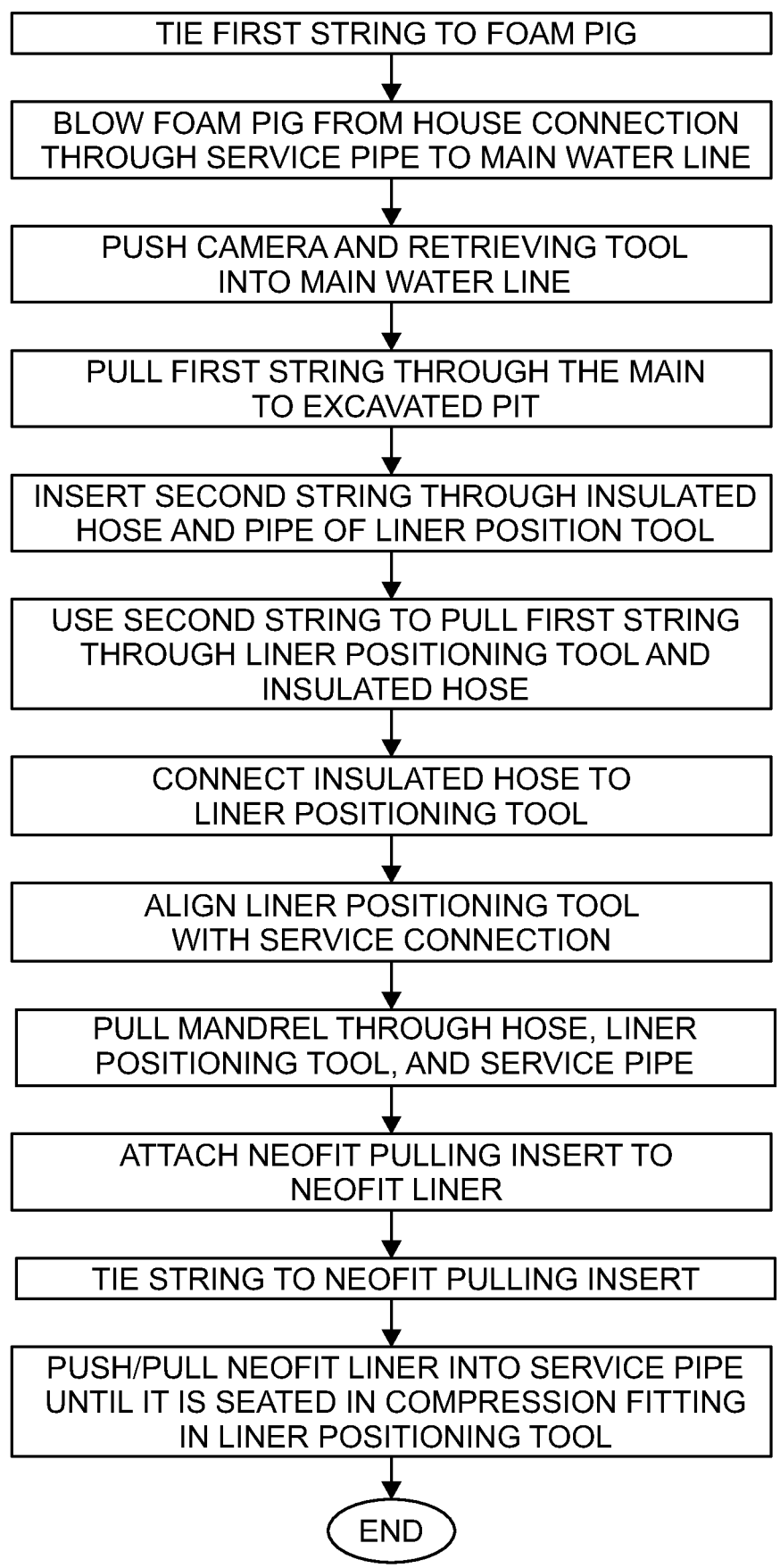
FIG. 14 is a simplified, representative flowchart in accordance with one example embodiment of the method.
Figure 15:
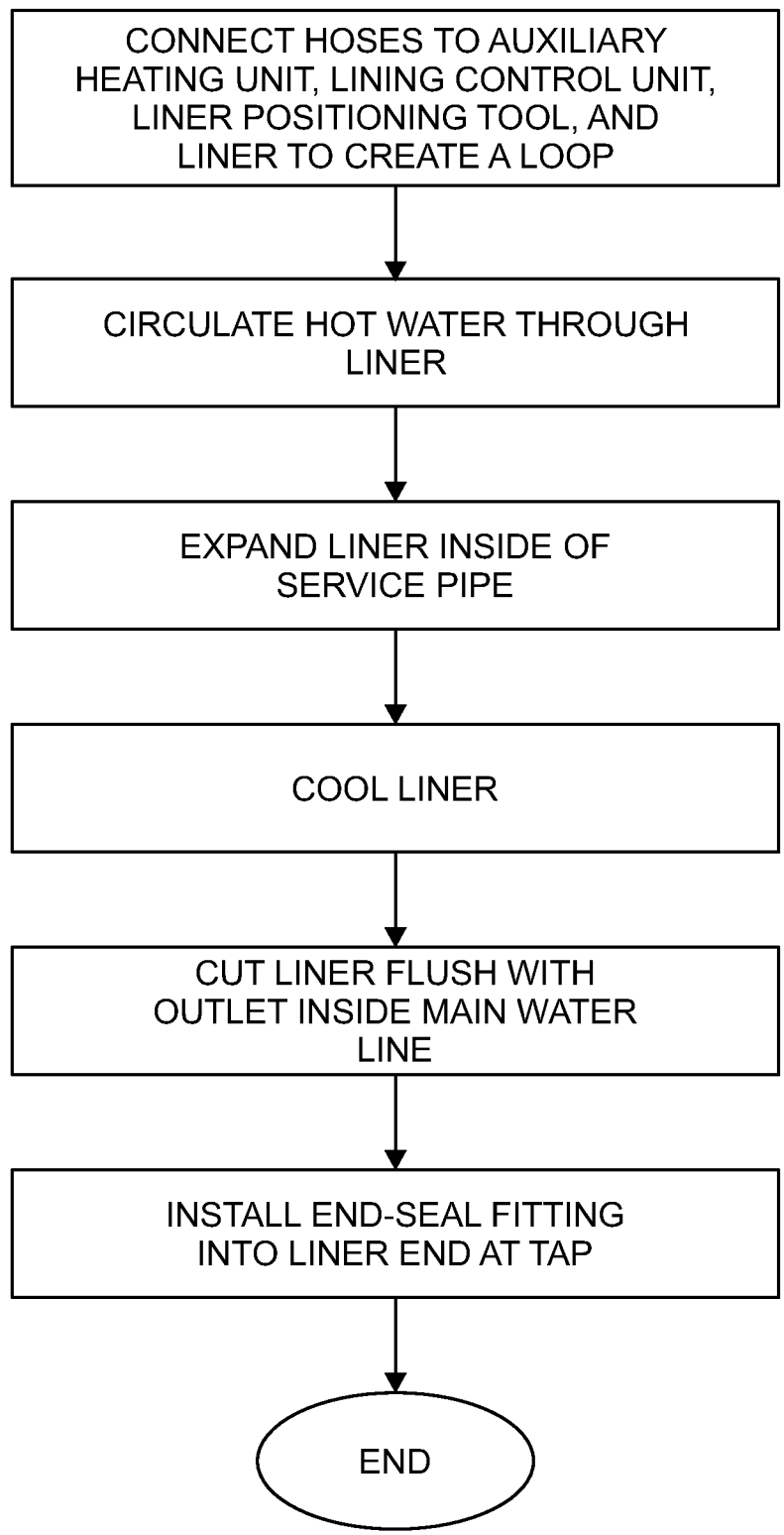
FIG. 15 is another simplified, representative flowchart in accordance with an example embodiment of the method.

The general steps for installing the liner are described here and also outlined in FIGS. 14 and 15. In the exemplary method, a first string 20 is used to pull a properly-sized pipe liner 30 through a first pipe 10. For example, the liner may be pulled (and also pushed) from a first end 12 of the pipe toward, and beyond, the second end 14 of the pipe 10. As shown in FIG. 1, the pipe 10 to be lined may be a water service pipe 10 that extends from a service pipe tap 52, which connects to a water main 50, and ends inside a house or building. To carry out the lining procedure, the first end of the pipe 10 should be accessible inside the building, and further, access to the water main 50 from both sides of the location of tap 52 is presumed.

Figure 4:
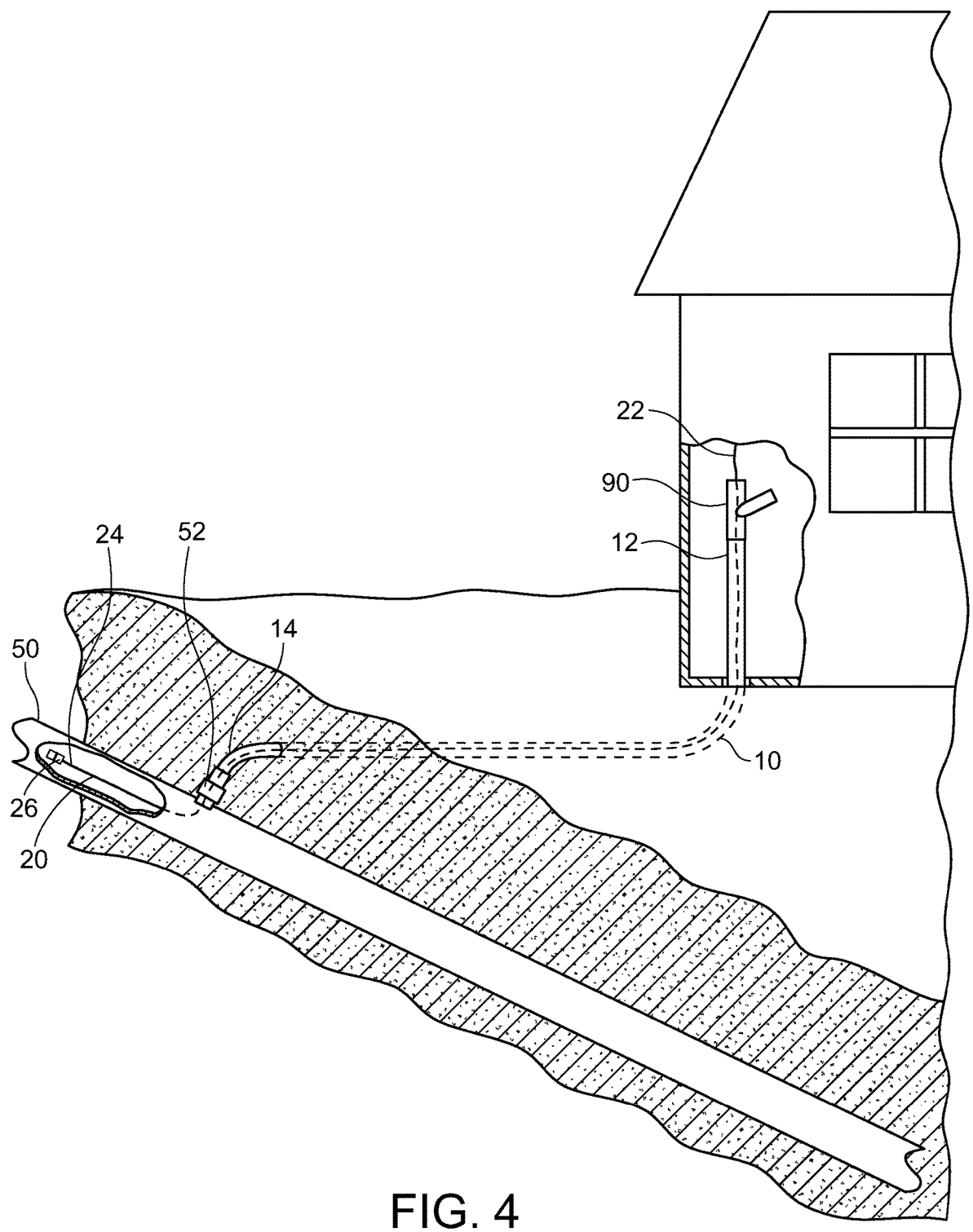
FIG. 4 is another perspective view of a system for lining pipes in accordance with an example embodiment.

To insert the liner, a string may be inserted into the pipe 10 from the building access point to inside the water main 50. Note that although terms may be used here for a particular installation, such as water service pipes, the method and system may also be used with other types of pipes, fluids, etc. From inside the house or building, one end 24 of the string 20 may passed through a hole in an air gun 90, as shown in FIG. 1, and then tied to a carrier 26, such as a foam pig, which may be made of foam or a similar compliant material, as shown in FIG. 4. The carrier 26 should be appropriately sized for the pipe being lined, which may be as small as ½", and larger. Once the string is tied to the carrier, compressed air through an air gun 90 may be used to "blow" the carrier 26 from the first end 12 of the pipe 10, through the pipe, and out the second end 14 of the pipe, inside the main pipe 50.

Next, to facilitate finding and retrieving the string, a retrieval tool and camera (not shown) can be inserted in the water main 50 from an excavated access pit beyond the tap location. The string 20 and carrier 26 can be pulled into the access pit at this point. Further, another, second string 28 can be inserted through the tube of the liner positioning tool 40 and a circulating hose 72 connected to the tube 42 at the back of the liner positioning tool 40. Then, the second string may be tied to the second end 24 of the first string 20 in order to pull the first string 20 through the hollow, positionable tube 42 of the liner positioning tool 40.

Figure 8:
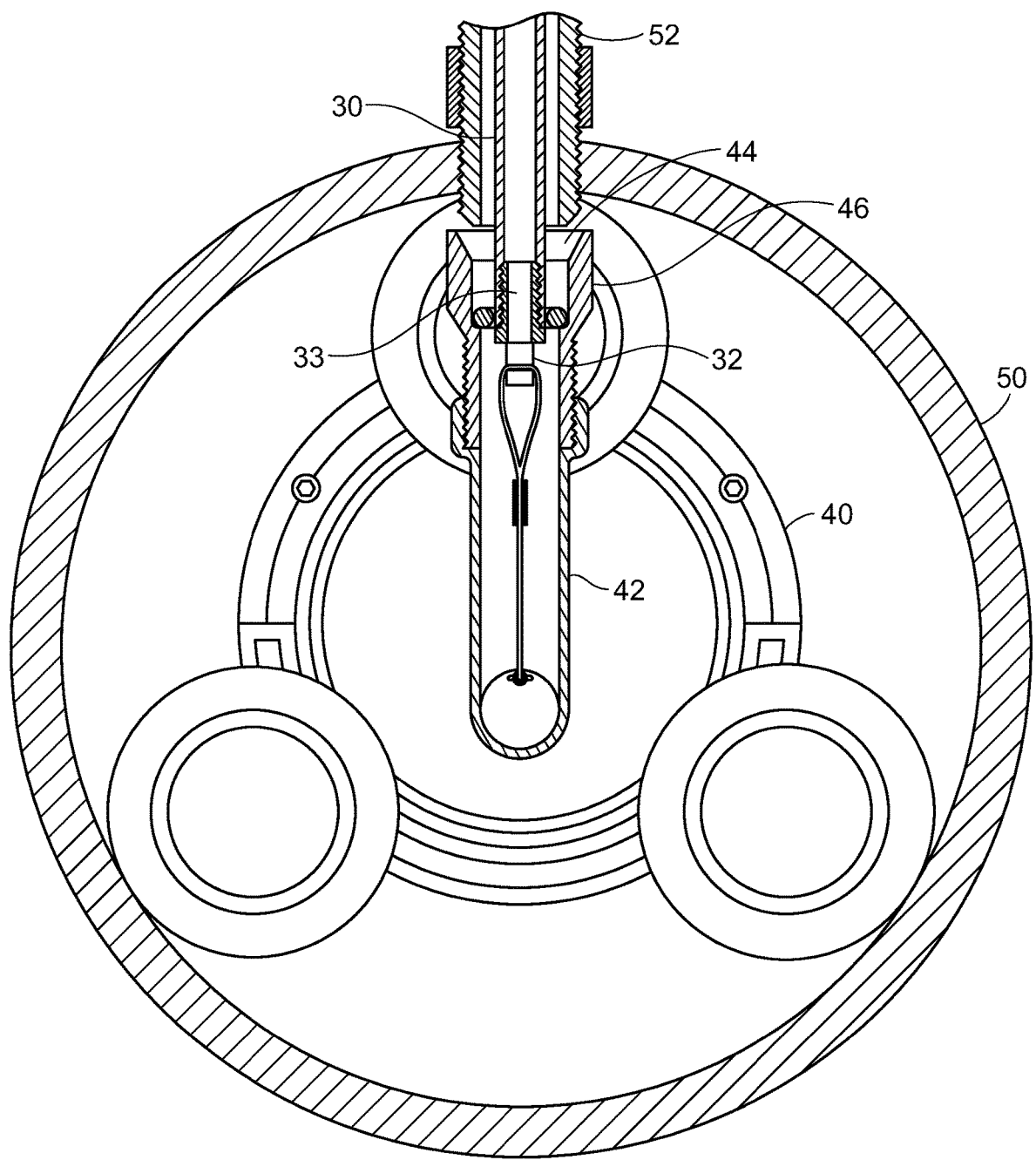
FIG. 8 is another cutaway view of part of the system for inserting a pipe liner in accordance with an example embodiment.

As explained in U.S. Pat. Nos. 9,541,230 and 10,174,877, which are hereby incorporated by reference, the liner positioning tool 40 is usable for efficiently inserting, positioning, and orienting a tool for use inside of a pipe, in this instance, water main 50. The liner positioning tool 40 is a tool that can be pushed or pulled into position inside of a pipe, and that has a camera, multiple inflatable bladders, and a motor/gear system (not shown) to rotate a positionable tube 42. The tool 40 can be used to very accurately position the tube 42 so that its opening 44 is very close to, and aligned with, the second end 14 of first pipe 10, as best shown in FIG. 8.

Figure 7:
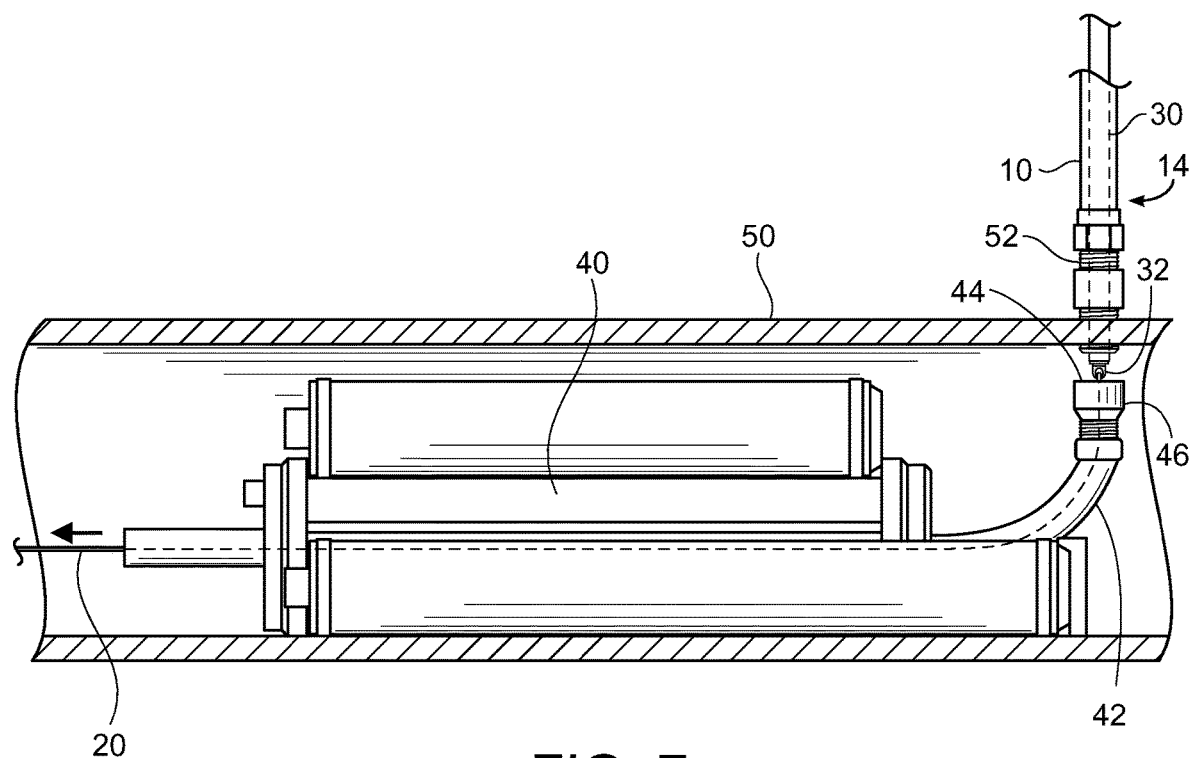
FIG. 7 is a cutaway view of part of the system for inserting a pipe liner in accordance with an example embodiment.

The tube 42 can be positioned in any orientation and accurately aligned with a service tap 52 by adjusting the air volume in selected bladders to move the tool itself (i.e., the tool can be moved closer to the inside wall of pipe 50 at any selected point of the inside wall), and further by rotating the tube 42 relative to the positioning tool 40. To do so, the liner positioning tool 40 may be remotely controlled so that the tube 42 can be positioned well inside of water main 50, as shown in FIG. 7. Because of the accurate alignment, pushing or pulling the liner 30 further into pipe 10 will ultimately result in the end of the liner being pushed into the sealing fitting 46 of the liner positioning tool 40, as described further below.

Once the string 20 is threaded through the hose 72, the liner positioning tool, and the first pipe 10 (while the liner positioning tool 40 is still in the access pit), the liner positioning tool 40 may be pulled with a cable into place adjacent the service pipe tap 52 inside of pipe 50. While the tool 40 is being moved, a person or device inside the house may pull on the string to take up any slack so that once the tool 40 is in position, the string 20 will be positioned on a smooth, continuous path all the way from an unconnected end of circulating hose 72, which is accessible by workers, to the end of pipe 10 inside the house.

Figure 5:
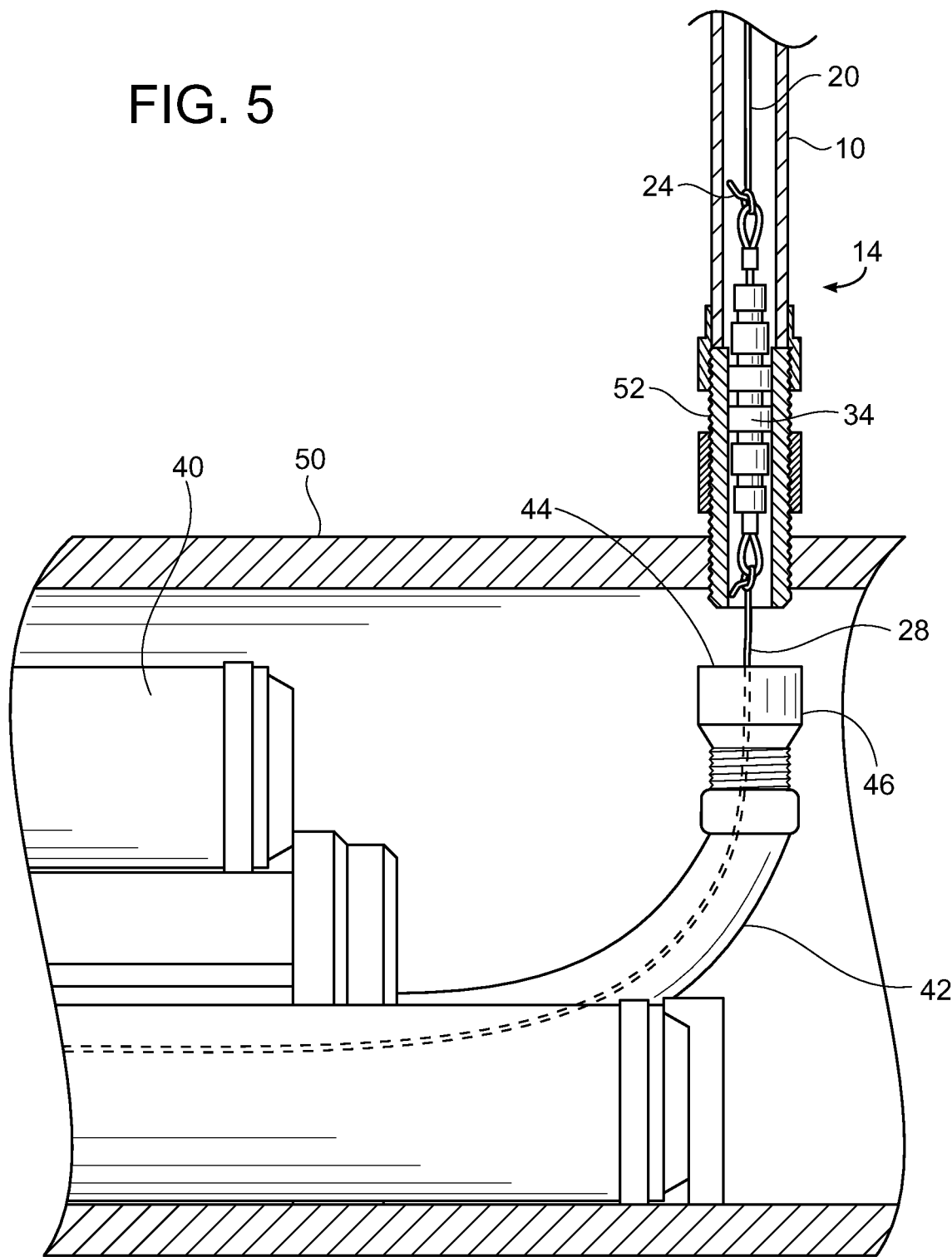
FIG. 5 is a cutaway view showing a mandrel within a pipe to be lined in accordance with an example embodiment.

At this point, if desired, an appropriately-sized mandrel 34 may be tied to the first string, as shown in FIG. 5, with a second string tied 28 to the opposite end of the mandrel, in order to pull the mandrel 34 back out of the pipe 10. The mandrel 34 is then ready to be pulled into and through the first pipe 10 being lined, to ensure that the liner 30 can be inserted. After doing so, the mandrel can be pulled back out of pipe 10, and the retrieval string untied.

Figure 6:
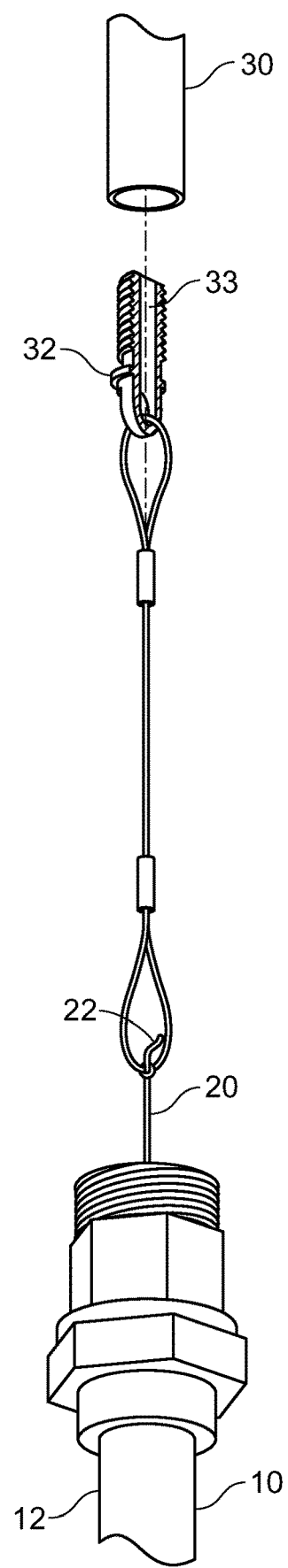
FIG. 6 is an exploded view of part of the system for inserting a pipe liner in accordance with an example embodiment.

Next, a pulling insert 32, which may comprise a hollow, threaded insert with a fluid passage 33, can be threaded securely into an end of liner 30, as shown in FIGS. 6 and 7. The end of string 20 inside the house (although it should be noted that the liner may be pulled into the pipe from either end) is then tied to the pulling insert 32, so that the insert 32 and the attached liner 30 can be pulled through pipe 10. The string is pulled from the open end of circulating hose 72 until the liner exits the pipe 10 inside the main pipe 50. It may be noted that at this point, the liner is considerably smaller than the inside diameter of pipe 50, which facilitates this step. To further aid insertion, the liner 30 may also be pushed from inside the house or building while it is being pulled from the other end of pipe 50. The string is pulled further until the liner 30 is firmly and sealingly seated in the opening 44 of tube 42, as best shown in FIG. 8. The opening 44 comprises a one-way sealing fitting 46 that captures the liner 30 without allowing it to reverse direction and pull out of the opening 44.

C. Expanding and Finishing the Liner.

Figure 2:
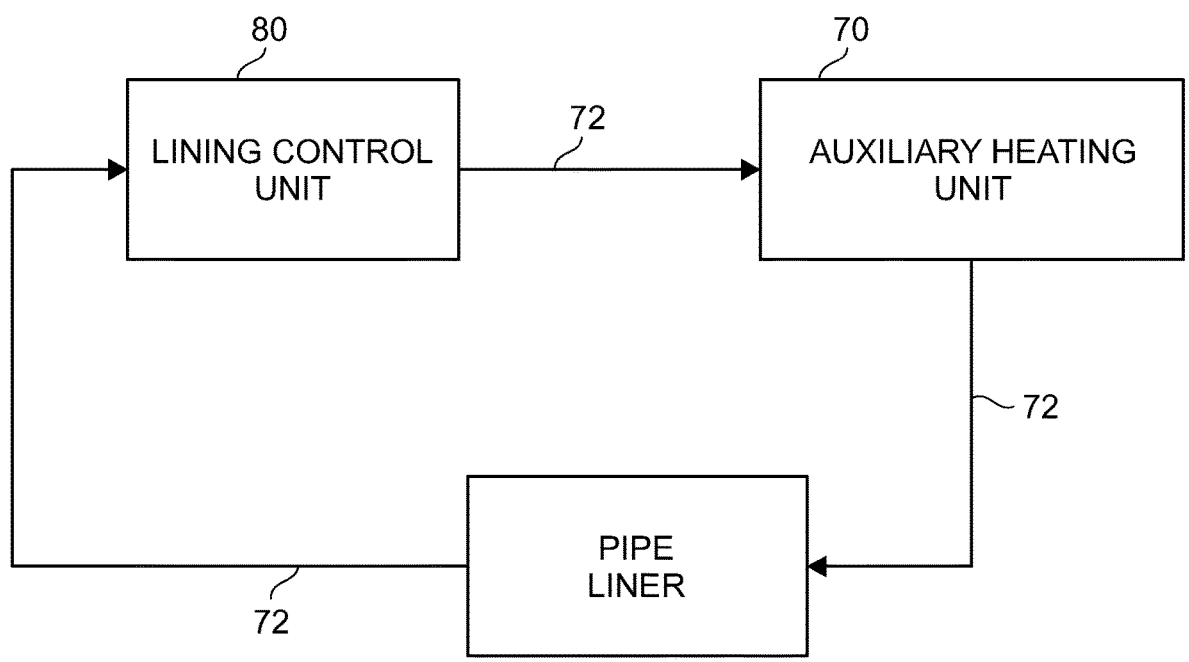
FIG. 2 is a block diagram of components of the system for lining pipes in accordance with an example embodiment.
Figure 3:
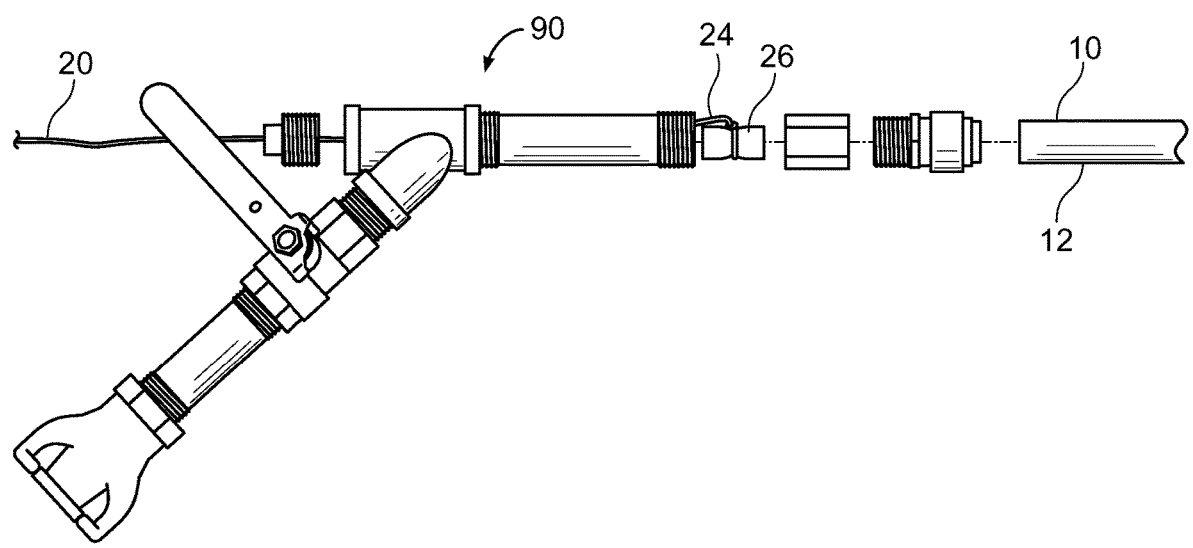
FIG. 3 is an exploded view of a carrier insertion air gun and components usable for lining pipes in accordance with an example embodiment.
Figure 9:
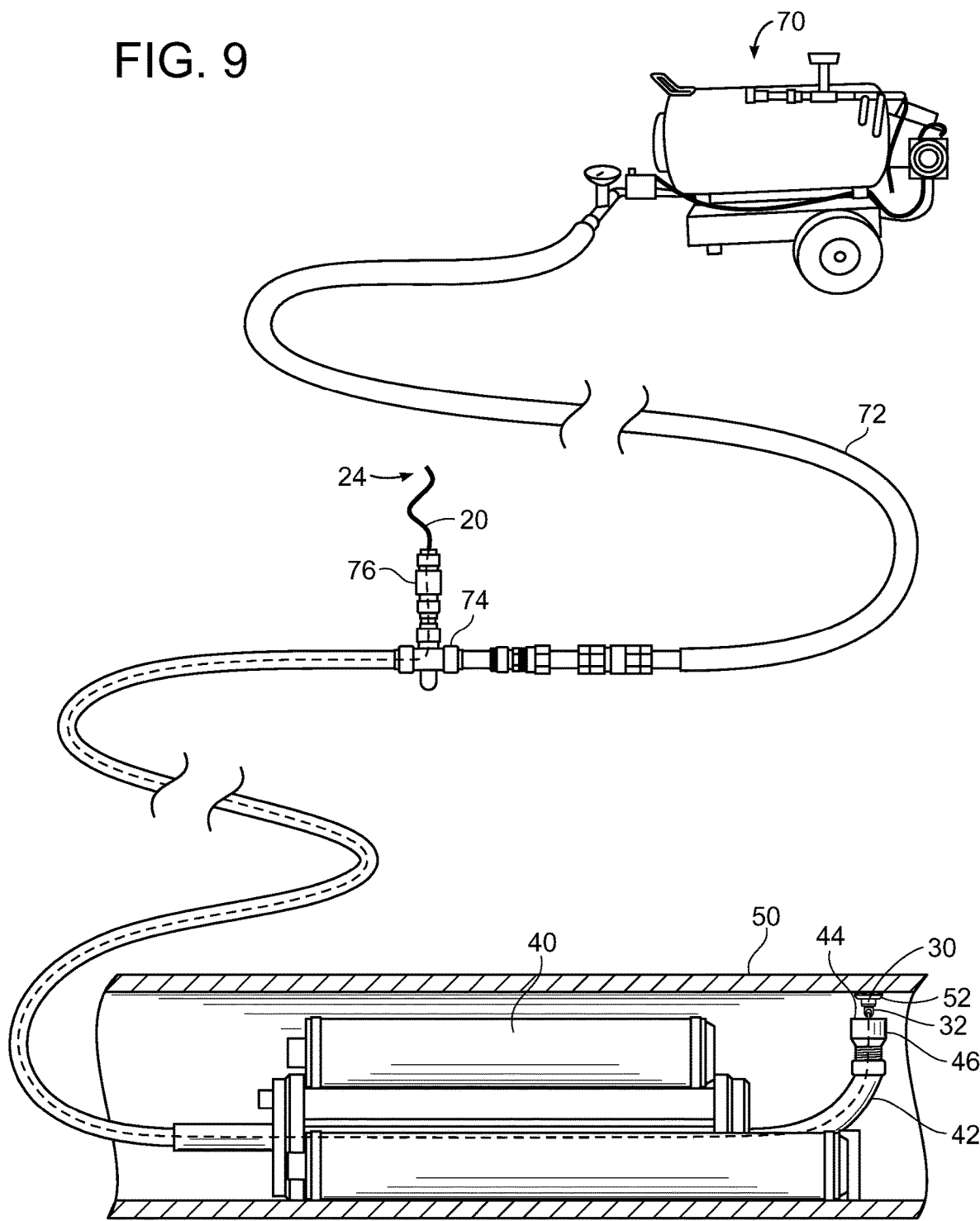
FIG. 9 is another perspective view of part of the system for inserting a pipe liner in accordance with an example embodiment.
Figure 10:
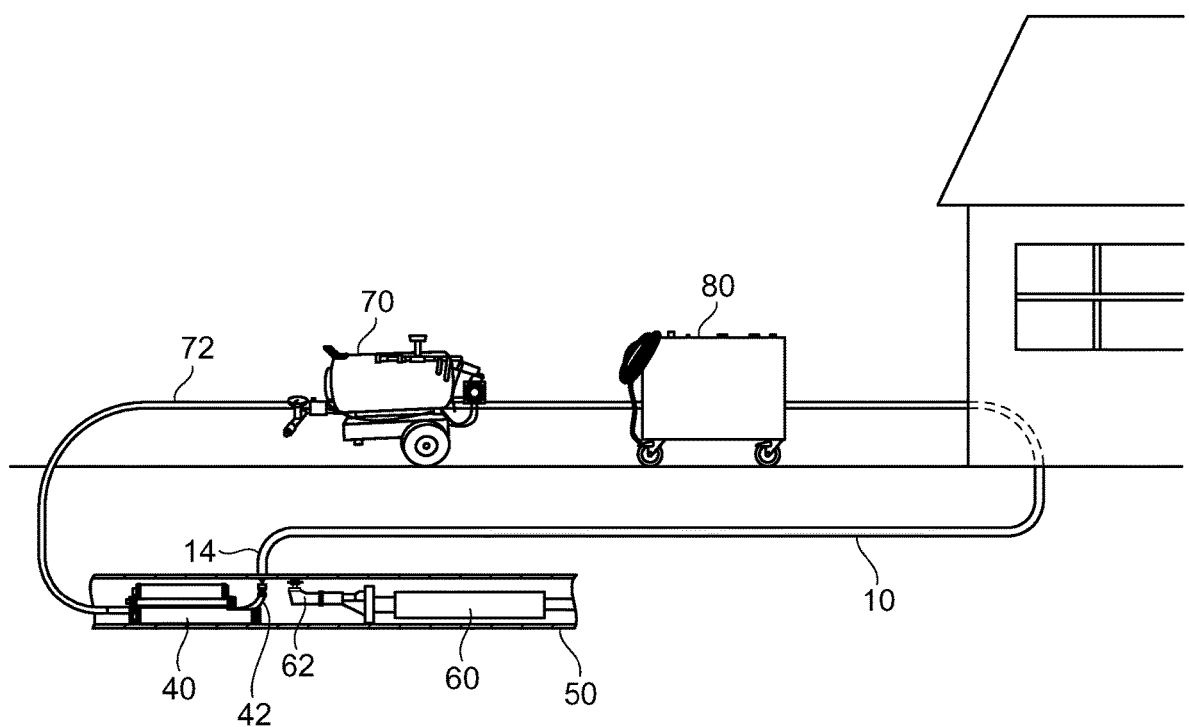
FIG. 10 is another perspective view of part of the system for inserting a pipe liner in accordance with an example embodiment.

Next, using a tee fitting 74, a ball valve 76 may be attached to circulating hose 72 that is connected to the liner positioning tool 40. The string 20 may then be pulled through a branch of the tee fitting 74 and the ball valve 76, and the ball valve can be closed with the string extending out of the valve opening, as shown in FIG. 9. Thus, the string is available but the system is sealed where the string exits the hose through the tee and the ball valve. The open branch of tee fitting 74 is then connected to another hot water circulating hose 72 that leads to the outlet side of auxiliary heating unit 70, as shown in FIG. 10 and represented in the block diagram of FIG. 2. As also shown in the figures, another hot water circulating hose is connected between the inlet of the auxiliary heating unit 70 and the outlet of the lining control unit 80. To complete the loop, another hot water circulating hose 72 is connected between the entry end of the liner, for example, inside of the house or building being served by the pipe 10. If necessary (such as, for example, for a longer pipe to be lined), more than one auxiliary heating unit can be used to circulate hot water as described here.

Once all the hoses 72 and the liner are in place, the lining control unit 80 may be turned on to circulate hot water through the hoses 72 and the liner 30 until the lining control unit 80 heats, pressurizes and expands the liner 30 inside the service pipe 10. As a result of this process, the walls of the liner are considerably thinner after expansion, and the liner 30 is in close contact with the inside of pipe 10, so that the water flow is largely unaffected by the liner. The expansion process, as well as the auxiliary heating unit 70, is discussed further in U.S. Pat. No. 8,807,171, which is hereby incorporated by reference. The auxiliary heating unit 70 provides sufficient capacity to heat and expand liner inside of pipes of varying sizes and lengths, and as noted above, any number of additional auxiliary heating units (not shown) may also be used as necessary, depending on the conditions where the liner is to be installed (e.g., the size and length of the service pipe).

Figure 11:
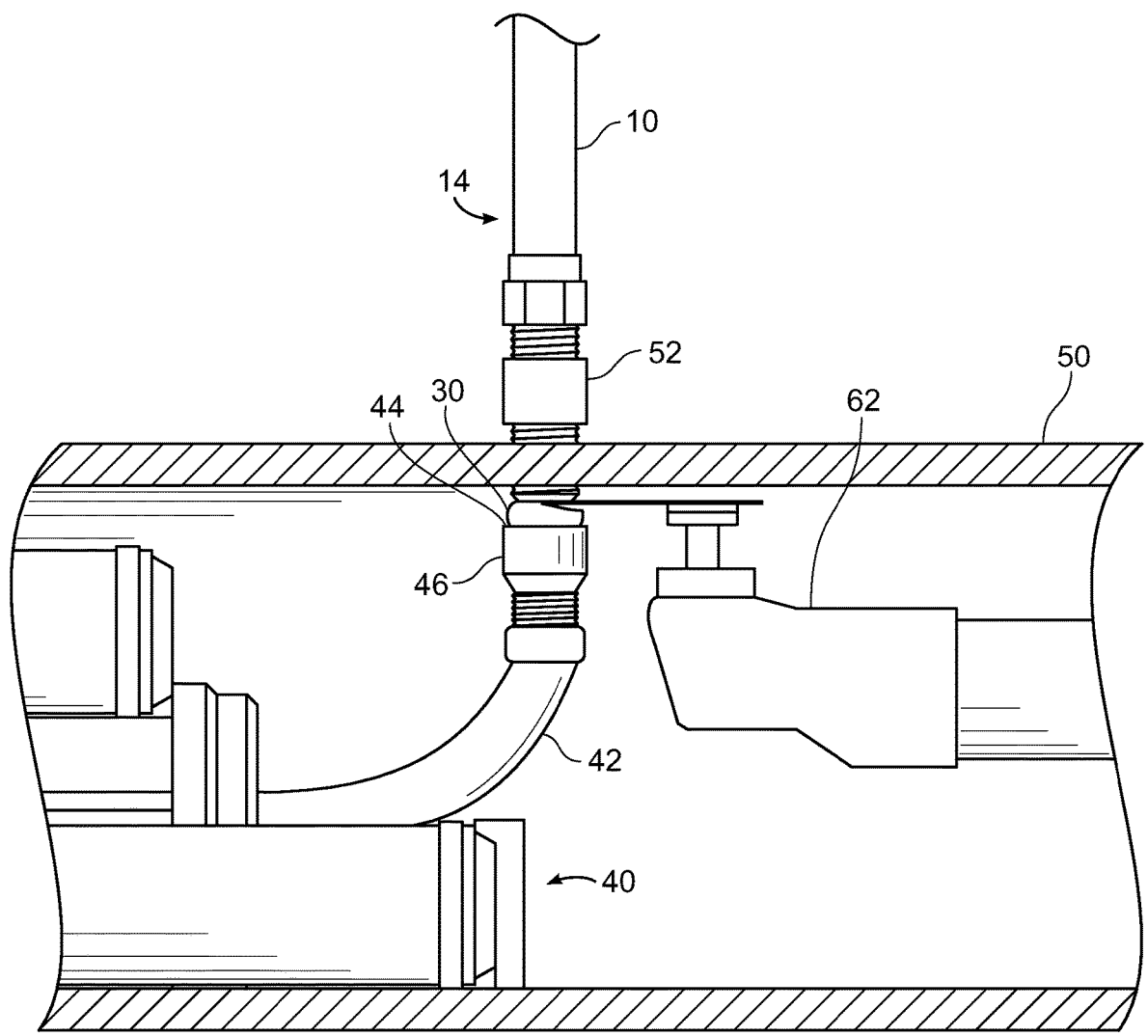
FIG. 11 is another cutaway view of part of the system for inserting a pipe liner in accordance with an example embodiment.

Once the expansion process is complete, the auxiliary heating unit 70 is turned off and cold air and/or water are blown through the hoses 72 and liner 30 to cool the liner. Once the liner 30 is sufficiently cooled, the lining control unit 80 may be turned off. At this point, the exposed liner 30 between the opening of the liner positioning tool 40 and the service pipe tap 52 inside the water main 50 may be cut flush with the tap 52. This may be done, as just one example, with a robotic positioning tool 60 with a reciprocating saw attachment 62, as shown in FIG. 11. Like the liner positioning tool, the robotic positioning tool 60 may be remotely operated from an access point beyond the position of the tap 52, and the tool 60 may also be positioned and operated within water main 50, as shown in FIG. 10.

Figure 12:
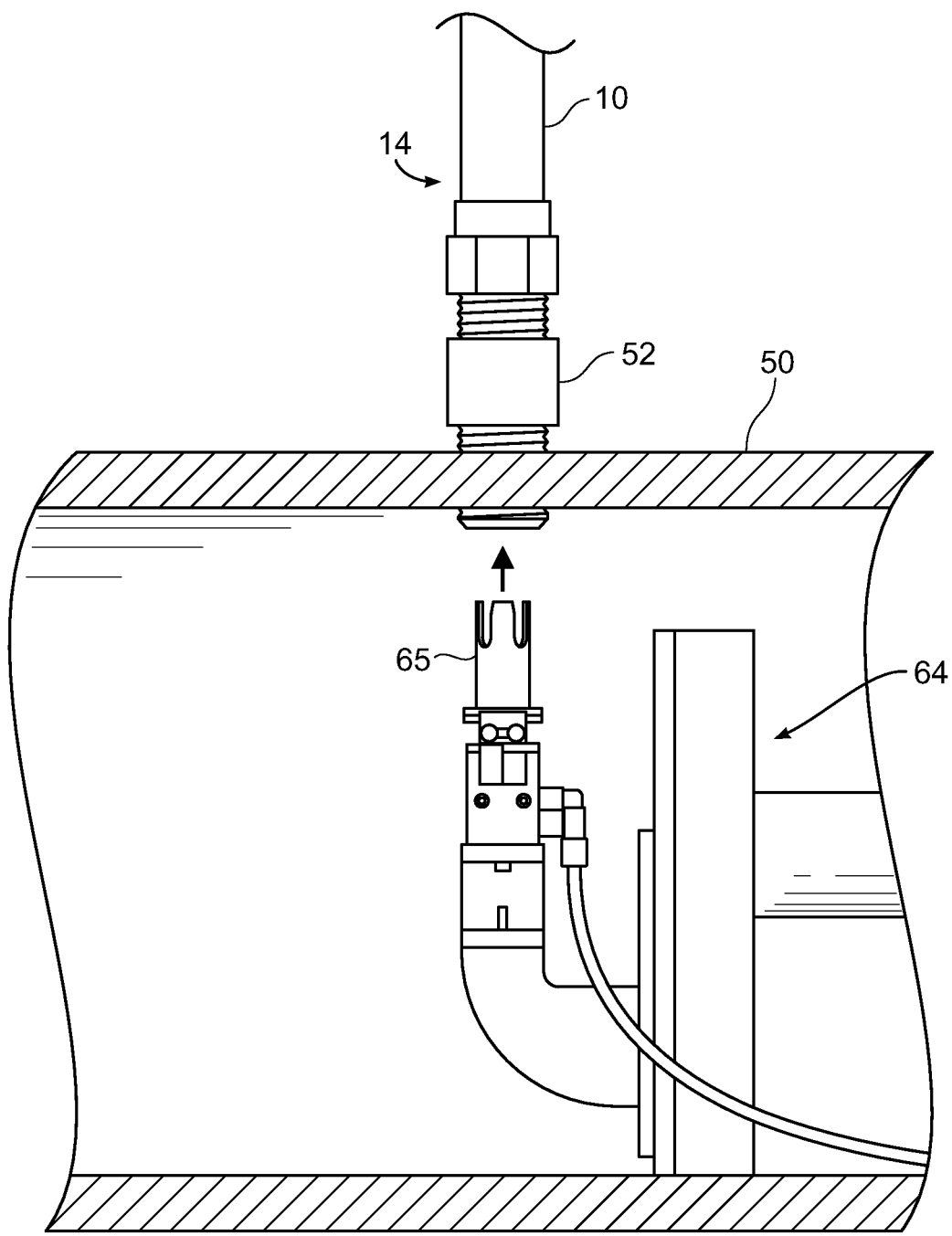
FIG. 12 is another cutaway view of part of the system for inserting a pipe liner in accordance with an example embodiment.
Figure 13:
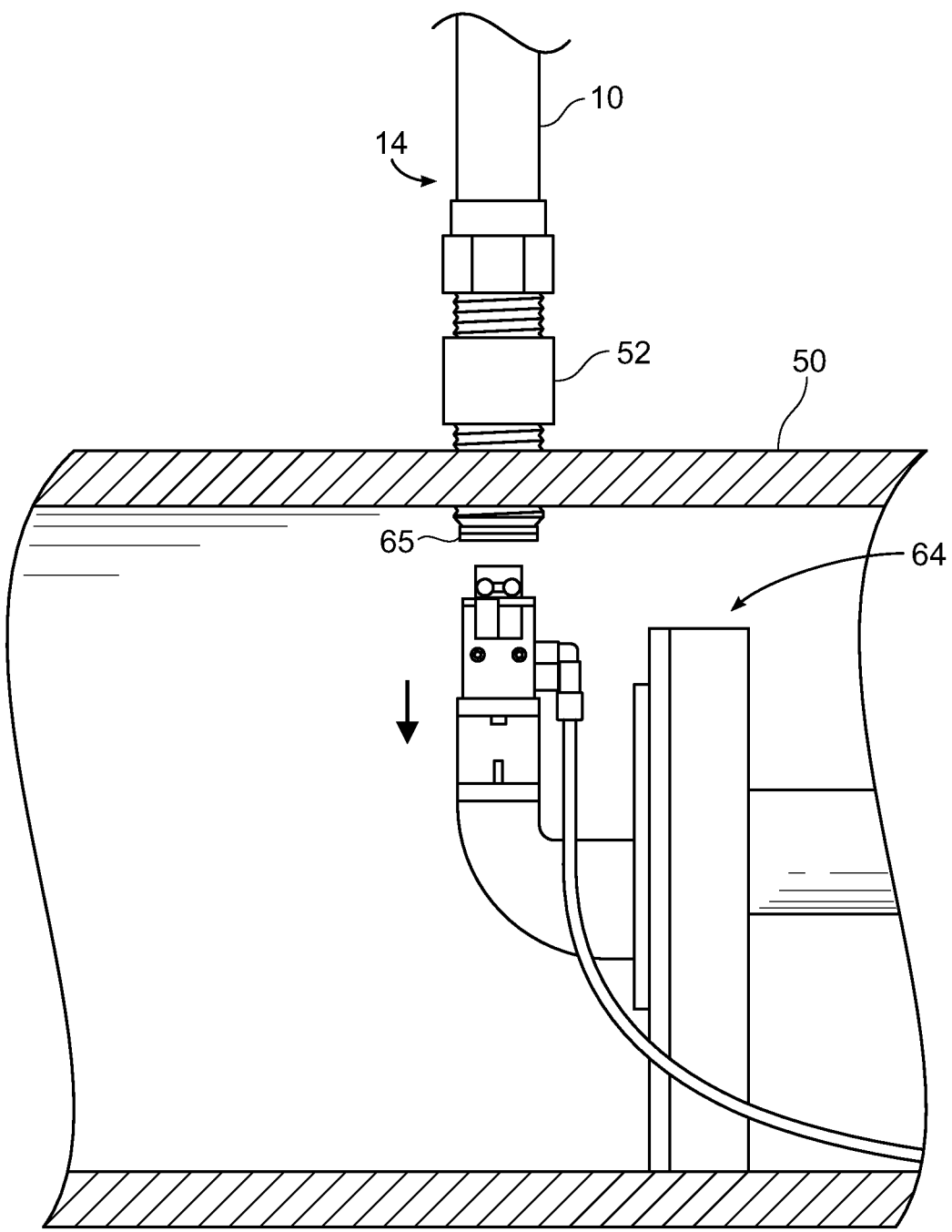
FIG. 13 is another cutaway view of part of the system for inserting a pipe liner in accordance with an example embodiment.

After the end of liner 30 has been cut, the robotic positioning tool 60 may be fitted with an end-seal fitting attachment 64, which forcibly inserts a liner end-seal fitting 65 into the end of the lined service pipe tap 52, inside the water main 50, as shown in FIGS. 12 and 13.

If the water main 50 is also to be lined after the service pipe 10 is lined, a liner end-seal fitting 65 that is plugged with a removable plastic plug may be used, rather than an open tube-like fitting that is otherwise used. The plug can be cut out or removed by the robotic positioning tool 60 after the water main is lined.

Once the pipe 10 is lined and the end-seal fitting is installed, the lined service pipe at the curb stop or inside the house or building can be reconnected to the existing pipes, and then the water may be turned on and pressurized within the lined pipe and the water main 50, and the system may be checked for leaks.

Unless otherwise defined, all technical and scientific terms used herein have the same meaning as commonly understood by one of ordinary skill in the art to which this invention belongs. Although methods and materials similar to or equivalent to those described herein can be used in the practice or testing of the method and system for lining pipes, suitable methods and materials are described above. All publications, patent applications, patents, and other references mentioned herein are incorporated by reference in their entirety to the extent allowed by applicable law and regulations. The method and system for lining pipes may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A method for installing a liner inside of a first pipe between a first end and a second end, the second end connected to a second pipe, the method comprising:
   inserting a first string inside the first pipe between the first end and the second end;
   inserting the first string through a liner positioning tool, the liner positioning tool comprising a tube with an opening;
   using the liner positioning tool to position the opening proximate the second end of the first pipe;
   attaching a first end of the first string to the liner; and
   pulling the liner into the first pipe with the first string such that the liner extends from the first end to the second end.

2. The method of claim 1, further comprising pulling a mandrel through the first pipe with the first string to ensure the liner will fit inside the first pipe.

3. The method of claim 1, wherein inserting the first string inside the first pipe comprises tying a second end of the first string to a carrier and using a compressed fluid to force the carrier through the first pipe from the first end to the second end.

4. The method of claim 3, wherein the compressed fluid is air.

5. The method of claim 1, wherein the liner positioning tool is inside the second pipe when it is used to position the opening.

6. The method of claim 5, wherein the opening comprises a sealing fitting, the method further comprising pulling the liner into the sealing fitting such that the liner is sealingly connected to the tube of the liner positioning tool.

7. The method of claim 6, further comprising:
   expanding the liner inside the first pipe by circulating a hot fluid under pressure through the liner.

8. The method of claim 7, further comprising:
   cooling the liner by circulating a fluid through the liner after the liner has been expanded.

9. The method of claim 8, wherein the fluid is air.

10. The method of claim 7, wherein the liner is expanded until it is in contact with an inside of the first pipe.

11. The method of claim 10, further comprising cutting off the expanded liner inside the second pipe, proximate the second end of the first pipe.

12. The method of claim 11, further comprising inserting an end-seal fitting into the expanded liner.

13. The method of claim 12, wherein the end-seal fitting is inserted by a robotic positioning tool.

14. The method of claim 1, wherein the first end of the first string is attached to the liner by an attachment means.

15. The method of claim 14, wherein the attachment means further comprises a means for allowing fluid flow through the liner.

16. The method of claim 1, wherein the first end of the first string is attached to the liner by a pulling insert that attaches to the liner.

17. The method of claim 16, wherein the pulling insert comprises a fluid passage.

18. The method of claim 16, wherein the pulling insert comprises threads for attachment to the liner.

19. The method of claim 18, wherein the pulling insert comprises a fluid passage.

20. A method for installing a liner inside a first pipe having a first end and a second end, the second end connected to a second pipe, the method comprising:
   inserting a string inside the first pipe between the first end and the second end;
   inserting the string through a tube in a liner positioning tool, wherein the tube comprises an opening;
   using the liner positioning tool to position the opening proximate the second end of the first pipe;
   attaching a first end of the string to the liner; and
   pulling the liner into the first pipe with the string such that the liner extends from the first end to the second end.

21. The method of claim 20, wherein inserting the string inside the first pipe comprises tying a first end of the string to a carrier and using compressed air to force the carrier through the first pipe from the first end to the second end.

22. A method for installing a liner inside a first pipe having a first end and a second end, the second end connected to a second pipe, the method comprising:
   inserting a string inside the first pipe by tying a second end of the string to a carrier and using compressed air to force the carrier through the first pipe from the first end to the second end;
   inserting the string through a tube in a liner positioning tool, wherein the tube comprises an opening;

using the liner positioning tool to position the opening proximate the second end of the first pipe;

attaching a first end of the string to the liner;

pulling the liner into the first pipe with the string such that the liner extends from the first end to the second end; and expanding the liner inside the first pipe by circulating a hot fluid under pressure through the liner until the liner is in contact with an inside of the first pipe.

\* \* \* \* \*